United States Patent
Satoh et al.

(10) Patent No.: US 8,259,386 B2
(45) Date of Patent: *Sep. 4, 2012

(54) WAVELENGTH CONVERSION ELEMENT AND METHOD FOR MANUFACTURING WAVELENGTH CONVERSION ELEMENT

(75) Inventors: Issei Satoh, Itami (JP); Michimasa Miyanaga, Itami (JP); Yoshiyuki Yamamoto, Itami (JP); Hideaki Nakahata, Itami (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 16 days.

This patent is subject to a terminal disclaimer.

(21) Appl. No.: 13/057,547

(22) PCT Filed: Jul. 28, 2009

(86) PCT No.: PCT/JP2009/063375
§ 371 (c)(1),
(2), (4) Date: Feb. 4, 2011

(87) PCT Pub. No.: WO2010/016408
PCT Pub. Date: Feb. 11, 2010

(65) Prior Publication Data
US 2011/0134509 A1    Jun. 9, 2011

(30) Foreign Application Priority Data

Aug. 6, 2008 (JP) .................................. 2008-203399
Jun. 8, 2009 (JP) .................................. 2009-137157

(51) Int. Cl.
    *G02F 1/35* (2006.01)
(52) U.S. Cl. .......................... 359/326; 359/328; 385/122
(58) Field of Classification Search ........................ None
    See application file for complete search history.

(56) References Cited

U.S. PATENT DOCUMENTS

| 5,150,447 | A   | * | 9/1992 | Tamada et al. ................ 385/130 |
| 5,943,465 | A   | * | 8/1999 | Kawaguchi et al. .......... 385/122 |
| 7,995,267 | B2  | * | 8/2011 | Satoh et al. .................... 359/326 |
| 2002/0051282 | A1 |   | 5/2002 | Tsuruma |

FOREIGN PATENT DOCUMENTS

| EP | 0 767 396 A2 | 4/1997 |
| JP | H-09-197455 A | 7/1997 |
| JP | 9-258283 | 10/1997 |
| JP | 2004-239959 A | 8/2004 |
| JP | 2007-272062 | 10/2007 |
| JP | 2008-170710 | 7/2008 |
| WO | 2009/075363 | 6/2009 |

* cited by examiner

*Primary Examiner* — Hemang Sanghavi
(74) *Attorney, Agent, or Firm* — Drinker Biddle & Reath LLP

(57) ABSTRACT

A wavelength conversion element having an improved property-maintaining life and a method for manufacturing the wavelength conversion element are provided. A wavelength conversion element 10a has an optical waveguide 13. The wavelength of incoming light 101 input from one end 13a of the optical waveguide 13 is converted and outgoing light 102 is output from the other end 13b of the optical waveguide 13. The wavelength conversion element includes a first crystal 11 composed of $Al_xGa_{(1-x)}N$ ($0.5 \leq x \leq 1$); and a second crystal 12 having the same composition as that of the first crystal. The first and second crystals 11 and 12 form a domain-inverted structure in which a polarization direction is periodically reversed along the optical waveguide 13, and the domain-inverted structure satisfies quasi phase matching conditions with respect to the incoming light 101. At least one of the first and second crystals has a dislocation density of $1 \times 10^3$ cm$^{-2}$ or more and less than $1 \times 10^7$ cm$^{-2}$.

6 Claims, 7 Drawing Sheets

WAVELENGTH CONVERSION ELEMENT AND METHOD FOR MANUFACTURING WAVELENGTH CONVERSION ELEMENT

TECHNICAL FIELD

The present invention relates to a wavelength conversion element and a method for manufacturing a wavelength conversion element.

BACKGROUND ART

Semiconductor lasers and solid state lasers have material-specific emission wavelengths and thus expansion of their wavelength ranges is directly connected to expansion of the fields of applications. While infrared sources have been used in environmental measurements and medical and biotechnology fields, their applications to automobile exhaust detection, laser ionization mass spectrometry, fruit sugar analysis, dental treatment, noninvasive blood test, and cerebral blood flow test are presently being studied.

However, light sources such as ruby lasers, yttrium-aluminum-garnet (YAG) lasers, and carbon dioxide lasers can emit only light of specific wavelengths. Although the wavelength of other light sources such as titanium-sapphire lasers is tunable, such light sources can only emit light having a wavelength near 650 nm to 1100 nm. Thus, it is not possible to obtain laser beams in all of the wavelength regions. Accordingly, wavelength conversion elements that can convert light having a specific wavelength emitted from a laser beam source into light having a different wavelength are desired.

Conventionally, wavelength conversion elements that use borate-based crystals such as barium borate (BBO) and lithium borate (LBO) have been known. According to such wavelength conversion elements, wavelength conversion is conducted by phase matching using the birefringence of the crystals. However, it is difficult to achieve a sufficient wavelength conversion efficiency using a wavelength conversion element that uses the birefringence of the crystals. Moreover, since the birefringence of the crystals is intrinsic to the crystals and cannot be adjusted, a wavelength conversion element that uses birefringence has low flexibility in terms of choice of wavelength, etc.

Wavelength conversion elements that use ferroelectric oxide crystals such as lithium niobate ($LiNbO_3$) and lithium tantalate ($LiTaO_3$) have also been known. These ferroelectric oxide crystals have a bias (polarization) in a specific direction of the atomic arrangement, and a positive polarization and a negative polarization respectively occur at two ends due to this bias. The polarization can be partly reversed by applying an electric field. Accordingly, when a periodic domain-inversed structure is formed in the ferroelectric oxide crystals, the interactive length can be increased compared to when birefringence matching of borate crystals is used, thereby enabling highly efficient wavelength conversion.

Japanese Unexamined Patent Application Publication No. 2008-170710 (Patent Literature 1) discloses a wavelength conversion element that uses a compound semiconductor crystal that contains nitrogen (N) and at least one of gallium (Ga), aluminum (Al), and indium (In) and has a spontaneous polarization. In Patent Literature 1, a polarized structure having a spontaneous polarization periodically reversed into a two-dimensional lattice geometry is formed in the compound semiconductor crystal, and this polarized structure satisfies quasi phase matching (QPM) conditions two-dimensionally with respect to incoming light of a first wavelength. Accordingly, since the interactive length can be increased compared to when birefringence matching of borate crystals is used, highly efficient wavelength conversion is made possible.

Patent Literature 1 discloses a method for making a wavelength conversion element by forming a two-dimensional domain-inverted structure using a compound semiconductor crystal. In particular, a mask pattern corresponding to a two-dimensional domain-inverted structure pattern is formed on a gallium nitride (GaN) substrate having a +c face. Then a GaN layer is formed in the +c axis direction on the +c face of the GaN substrate and the mask pattern. In this case, a +c region is epitaxially grown on the +c face of the GaN substrate so that the thickness of the GaN layer increases in the +c axis direction, and a −c region is epitaxially grown on the mask layer so that the thickness of the GaN layer increases in the −c axis direction. Thus, a two-dimensional domain-inverted structure is formed.

CITATION LIST

Patent Literature

PTL 1: Japanese Unexamined Patent Application Publication No. 2008-170710

SUMMARY OF INVENTION

Technical Problem

However, ferroelectric oxide crystals such as $LiNbO_3$ and $LiTaO_3$ have a perovskite-type crystal structure with a center ion such as niobium (Nb) and tantalum (Ta). In order to form a polarized structure in a ferroelectric oxide crystal, voltage is applied to move the center ion according to the polarization. The inventors of the present invention are the first to show that the wavelength conversion element that uses a ferroelectric oxide crystal cannot maintain its properties over a long time due to weakening of the crystal caused by voltage application.

$Al_xGa_{(1-x)}N$ ($0.5 \leq x \leq 1$) (also referred to as "AlGaN" hereinafter) crystals such as aluminum nitride (AlN) crystals having an energy band gap of 6.2 eV, a thermal conductivity of about 3.3 $WK^{-1} cm^{-1}$, and a high electrical resistance have been used as a material for short-wavelength optical devices. Thus, AlGaN crystals are expected to be used in wavelength conversion elements. However, when an AlGaN layer is formed on a GaN substrate by a method for manufacturing a wavelength conversion element disclosed in Patent Literature 1, the crystallinity of the formed AlGaN layer is degraded due to a difference in composition between the GaN substrate and AlGaN. The inventors of the present invention are the first to show that when the AlGaN layer has low crystallinity, the properties of the wavelength conversion element cannot be maintained over a long time due the low crystallinity.

The present invention has been made to address the problems described above. An object thereof is to provide a wavelength conversion element having an improved property-maintaining life and a method for manufacturing the wavelength conversion element.

Solution to Problem

The inventors of the present invention have found that the wavelength conversion element cannot maintain its properties over a long time when the dislocation density is high. In other words, heat induced by energy of incoming light is absorbed by the dislocations and the property-maintaining life of the wavelength conversion element is shortened by this heat.

The inventors have thoroughly investigated the extent of reducing the dislocation density at which the property-maintaining life of the wavelength conversion element is effectively improved. As a result, the inventors have found that the dislocation density of at least one crystal forming the domain-inverted structure should be less than $1\times10^7$ cm$^{-2}$.

A wavelength conversion element of the present invention is a wavelength conversion element that has an optical waveguide and that converts a wavelength of incoming light input from one end of the optical waveguide and outputs outgoing light from the other end of the optical waveguide. The wavelength conversion element includes a first crystal composed of $Al_xGa_{(1-x)}N$ ($0.5 \leq x \leq 1$) and a second crystal having the same composition as that of the first crystal. The first and second crystals form a domain-inverted structure in which a polarization direction is periodically reversed along the optical waveguide. The domain-inverted structure satisfies quasi phase matching conditions with respect to the incoming light. At least one of the first and second crystals has a dislocation density of $1\times10^3$ cm$^{-2}$ or more and less than $1\times10^7$ cm$^{-2}$.

According to the wavelength conversion element of the present invention, at least one of the first and second crystals has a dislocation density of $1\times10^3$ cm$^{-2}$ or more and less than $1\times10^7$ cm$^{-2}$. Since the dislocation density is less than $1\times10^7$ cm$^{-2}$, absorption of the energy of the incoming light by dislocations can be suppressed. Thus, the increase in temperature of the crystals constituting the optical waveguide can be suppressed. When the wavelength conversion element is used, the decrease (attenuation ratio) in intensity of the outgoing light caused by heat can be suppressed. Thus, the wavelength conversion element that uses $Al_xGa_{(1-x)}N$ ($0.5 \leq x \leq 1$) has an improved property-maintaining life.

In the wavelength conversion element described above, at least one of the first and second crystals preferably has a dislocation density of $1\times10^3$ cm$^{-2}$ or more and less than $1\times10^5$ cm$^{-2}$.

According to this feature, the absorption of the energy of the incoming light by dislocations can be further suppressed. Thus, a wavelength conversion element that has a more improved property-maintaining life can be realized.

Another aspect of the present invention provides a method for manufacturing a wavelength conversion element that has an optical waveguide and that converts a wavelength of incoming light input from one end of the optical waveguide and outputs outgoing light from the other end of the optical waveguide. The method includes the following steps: preparing an undersubstrate composed of $Al_xGa_{(1-x)}N$ ($0.5 \leq x \leq 1$); growing a crystal having the same composition as that of the undersubstrate on the undersubstrate; dividing the crystal into two or more parts so that the polarization thereof is inverted to thereby form a first crystal and a second crystal; and forming a domain-inverted structure in which polarization directions of the first and second crystals is periodically reversed along the optical waveguide and bonding the first and second crystals so that the domain-inverted structure satisfies quasi phase matching conditions with respect to the incoming light.

Another aspect of the present invention provides a method for manufacturing a wavelength conversion element that has an optical waveguide and that converts a wavelength of incoming light input from one end of the optical waveguide and outputs outgoing light from the other end of the optical waveguide. The method includes the following steps: preparing an undersubstrate composed of $Al_xGa_{(1-x)}N$ ($0.5 \leq x \leq 1$); growing a first crystal having the same composition as that of the undersubstrate on the undersubstrate; preparing a second crystal having the same composition as that of the first crystal; and forming a domain-inverted structure in which polarization directions of the first and second crystals is periodically reversed along the optical waveguide and bonding the first and second crystals so that the domain-inverted structure satisfies quasi phase matching conditions with respect to the incoming light.

Yet another aspect of the present invention provides a method for manufacturing a wavelength conversion element that has an optical waveguide and that converts a wavelength of incoming light input from one end of the optical waveguide and outputs outgoing light from the other end of the optical waveguide. The method includes the following steps: preparing an undersubstrate composed of $Al_xGa_{(1-x)}N$ ($0.5 \leq x \leq 1$); growing a first crystal having the same composition as that of the undersubstrate on the undersubstrate; forming two or more projecting portions that are regularly arranged on a surface of the first crystal; and growing a second crystal, which is an amorphous crystal, having the same composition as that of the first crystal on the surface of the first crystal. In the step of growing the second crystal, a domain-inverted structure in which polarization directions of the first and second crystals are periodically reversed along the optical waveguide is formed and the first and second crystals are formed so that the domain-inverted structure satisfies quasi phase matching conditions with respect to the incoming light.

Still another aspect of the present invention provides a method for manufacturing a wavelength conversion element that has an optical waveguide and that converts a wavelength of incoming light input from one end of the optical waveguide and outputs outgoing light from the other end of the optical waveguide. The method includes the following steps: preparing an undersubstrate composed of $Al_xGa_{(1-x)}N$ ($0.5 \leq x \leq 1$); forming a mask layer having an opening on the undersubstrate; and forming a first crystal grown by making contact with the undersubstrate and a second crystal grown by making contact with the mask layer by growing crystals having the same composition as that of the undersubstrate on the undersubstrate and the mask layer. In the forming step, a domain-inverted structure in which polarization directions of the first and second crystals are periodically reversed along the optical waveguide is formed and the first and second crystals are formed so that the domain-inverted structure satisfies quasi phase matching conditions with respect to the incoming light.

According to the methods for manufacturing the wavelength conversion elements of the present invention, the first and second crystals having the same composition as that of the undersubstrate are grown on the undersubstrate. Thus, lattice mismatch between the undersubstrate and the crystal etc., can be moderated and a crystal having a low dislocation density, i.e., $1\times10^3$ cm$^{-2}$ or more and less than $1\times10^7$ cm$^{-2}$, can be formed. Since the first crystal or the first and second crystals are formed by using such a crystal, the dislocation density of the first crystal or the first and second crystals constituting the optical waveguide is less than $1\times10^7$ cm$^{-2}$. Accordingly, a wavelength conversion element having an improved property-maintaining life can be manufactured.

Advantageous Effects of Invention

According to the wavelength conversion element and the methods for manufacturing the wavelength conversion elements, at least one of the first and second crystals has a low dislocation density and thus the influence of heat can be suppressed. Thus, a wavelength conversion element having an improved property-maintaining life can be realized.

DESCRIPTION OF EMBODIMENTS

Figure 1:
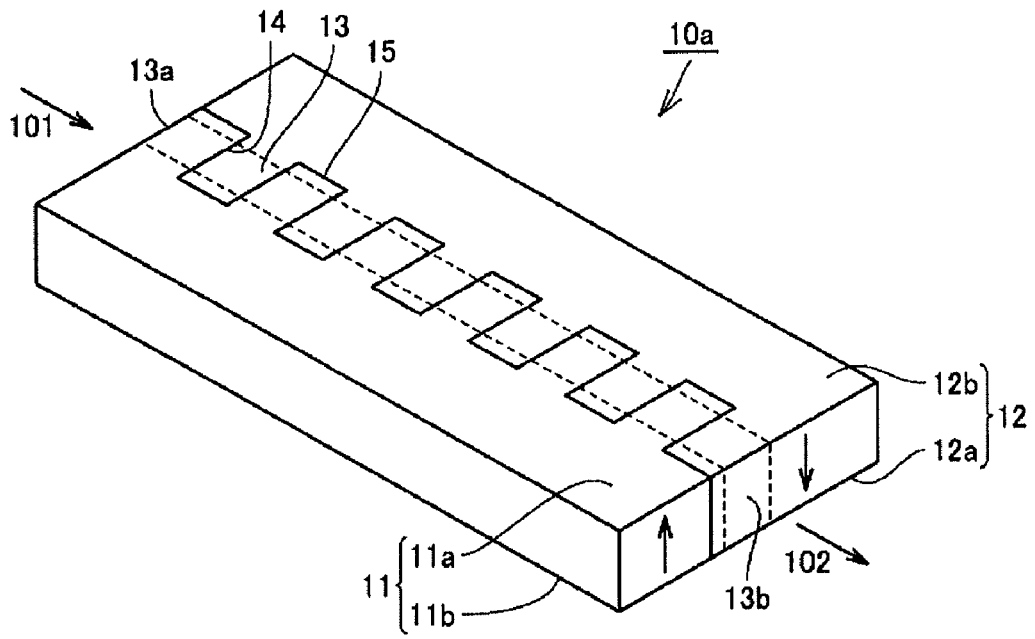
FIG. 1 is a perspective view schematically showing a wavelength conversion element according to a first embodiment of the present invention.

The embodiments of the present invention will now be described with reference to the drawings. Note that the same or corresponding components in the drawings are represented by the same reference symbols and the descriptions therefor are omitted to avoid redundancy.

First Embodiment

FIG. 1 is a perspective view schematically showing a wavelength conversion element according to this embodiment. First, a wavelength conversion element 10a of the embodiment is described with reference to FIG. 1.

As shown in FIG. 1, the wavelength conversion element 10a of this embodiment includes an optical waveguide 13. The optical waveguide 13 converts the wavelength of incoming light 101 entering from one end 13a side of the optical waveguide 13 and emits outgoing light 102 from the other end 13b side of the optical waveguide 13.

The wavelength conversion element 10a includes a first crystal 11 composed of $Al_xGa_{(1-x)}N$ ($0.5 \leq x \leq 1$) and a second crystal 12 having the same composition as the first crystal 11.

The composition ratio x in $Al_xGa_{(1-x)}N$ indicates the molar ratio of Al. The first and second crystals 11 and 12 are preferably single crystals.

The first and second crystals 11 and 12 each have a comb shape and regularly arranged projecting portions in the surfaces and are fitted with each other. In other words, the first and second crystals 11 and 12 each have projecting portions and recessed portions, the projecting portions of the first crystal 11 are fitted into the recessed portions of the second crystal 12, and the recessed portions of the first crystal 11 are fitted with the projecting portions of the second crystal 11.

The first and second crystals 11 and 12 form a domain-inverted structure in which the polarization direction is periodically inverted along the optical waveguide 13. In other words, the optical waveguide 13 for confining light waves is formed in the first and second crystals 11 and 12 that form the domain-inverted structure. The domain-inverted structure satisfies the quasi phase matching conditions with respect to the incoming light 101. Here, the "quasi phase matching conditions" refer to conditions for a structure having a nonlinear optical coefficient, sign of which is periodically reversed along the propagation axis of a nonlinear optical crystal, under which phase-matching is performed by compensating the difference between the wave vector of the nonlinear polarization and the wave vector of the light wave to be generated with the wave vector of the periodic structure.

The first and second crystals 11 and 12 are, for example, respectively polarized such that the directions of the arrows indicated in the first and second crystals 11 and 12 in FIG. 1 indicate the positive poles. In other words, the direction of the positive pole of the first crystal 11 is opposite to that of the second crystal 12 in this embodiment. When the first and second crystals 11 and 12 are AlN, a first face 11a which is the positive pole of the first crystal 11 is the Al polar surface and a second face 12a opposite to the positive pole of the second crystal 12 is the N polar surface.

The polarization direction of the first and second crystals 11 and 12 is periodically reversed along the optical waveguide 13. When one period is assumed to be constituted by a first crystal and a second crystal that are next to each other in the optical waveguide 13, the wavelength conversion element 10a has one or more period and preferably five or more periods.

Interfaces 14 that lie between the first and second crystals 11 and 12, constituting a optical wave guide 13, and extend in a direction intersecting the direction in which the optical waveguide 13 extends preferably have no gap. The orientation of polarization is reversed at these interfaces 14. In contrast, interfaces 15 that lie between the first and second crystals 11 and 12 and extend in the direction in which the optical waveguide 13 extends may have gaps.

At least one of the first and second crystals 11 and 12 has a dislocation density of $1 \times 10^3$ cm$^{-2}$ or more and less than $1 \times 10^7$ cm$^{-2}$ and preferably $1 \times 10^3$ cm$^{-2}$ or more and less than $1 \times 10^5$ cm$^{-2}$. In this embodiment, the dislocation densities of the first and second crystals 11 and 12 are within the above described range. When the density is less than $1 \times 10^7$ cm$^{-2}$, the absorption of the energy of the incoming light 101 by the dislocations can be suppressed, the decrease in intensity of the outgoing light 102 by use can be suppressed, and thus the property-maintaining life can be improved. When the density is less than $1 \times 10^5$ cm$^{-2}$, the absorption of the energy of the incoming light 101 by the dislocations can be effectively suppressed. The dislocation density is preferably low. From the viewpoint of ease of production, the lower limit is $1 \times 10^3$ cm$^{-2}$.

The dislocation density is the value measured by an alkali etching method involving etching in, for example, a molten potassium hydroxide (KOH) and dividing counting the number of etch pits per unit area (etch pit density or EPD).

The first and second crystals 11 and 12 are composed of $Al_xGa_{(1-x)}N$ ($0.5 \leq x \leq 1$). Considering the thermal conductivity at an Al composition ratio x of 0.5 to 1, the lifetime can be improved when the dislocation density is the above-described value.

The refractive index of the first crystal is preferably not substantially different from that of the second crystal 12. When there is no substantial difference in refractive index, reflection of light at the interfaces 14 that lie between the first and second crystals 11 and 12 and intersect the direction in which the optical waveguide 13 extends (direction of propagation of the incoming light 101) can be suppressed. Thus, the loss of transmittance of the incoming light 101 transmitting the optical waveguide 13 can be reduced. The meaning of "there is no substantial difference in refractive index" is that when there are five periods of the first and second crystals 11 and 12 (i.e., when there are nine interfaces 14 between the first and second crystals 11 and 12), the difference in refractive index between the first and second crystals is 0.01 or less and when there are ten periods of the first and second crystals 11 and 12, the difference in refractive index is 0.001 or less. In these cases, the wavelength conversion element 10a has a transmittance of, for example, 90% or more.

The refractive index is a value measured using a spectroscopic ellipsometer by spectroscopic ellipsometry at a wavelength of 400 to 800 nm.

Figure 2:
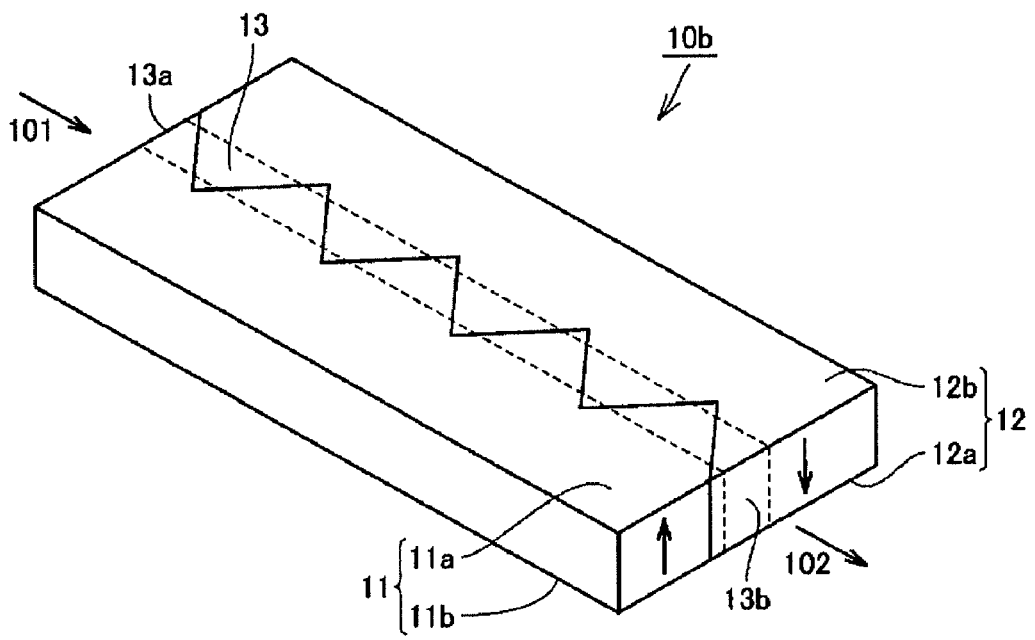
FIG. 2 is a perspective view schematically showing a wavelength conversion element according to a modification of the first embodiment of the present invention.

FIG. 2 is a perspective view schematically showing a wavelength conversion element 10b according to a modification of this embodiment. As shown in FIG. 2, the first and second crystals 11 and 12 may each have a sawtooth-shaped side. Alternatively, the shape of the first and second crystals 11 and 12 is not limited to a comb shape, a sawtooth shape, etc, and may be any other shape such as a wavy shape.

Figure 3:
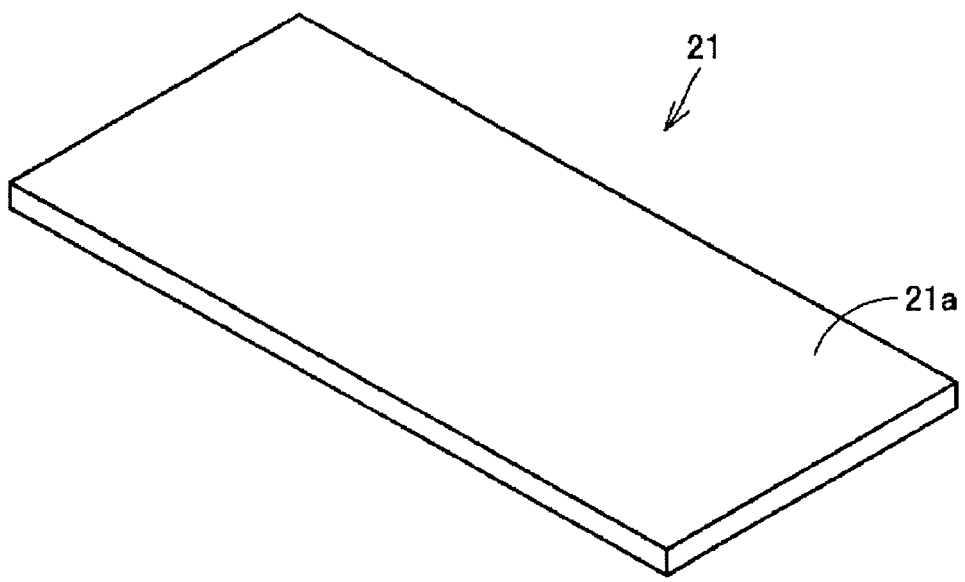
FIG. 3 is a perspective view schematically showing an undersubstrate according to the first embodiment of the present invention.

Next, a method for manufacturing the wavelength conversion element according to this embodiment is described. FIG. 3 is a perspective view schematically showing an undersubstrate 21 according to this embodiment. As shown in FIG. 3, the undersubstrate 21 composed of $Al_xGa_{(1-x)}N$ ($0.5 \leq x \leq 1$) is prepared. The undersubstrate 21 has the same composition as a crystal 22 to be grown thereon. The undersubstrate 21 has a main surface 21a. The main surface 21a is, for example, a (001) surface (c surface).

Figure 4:
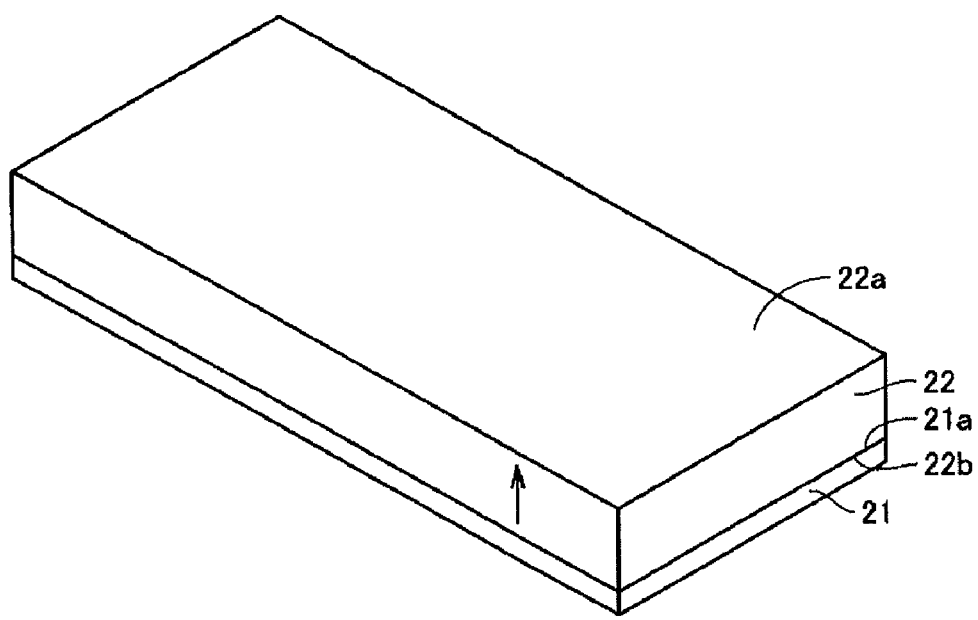
FIG. 4 is a perspective view schematically showing the state of the grown crystal according to the first embodiment of the present invention.

FIG. 4 is a perspective view schematically showing the state of the grown crystal 22 according to this embodiment. As shown in FIG. 4, the crystal 22 having the same composition as the undersubstrate 21 is grown on the main surface 21a of the undersubstrate 21. Since the lattice mismatch between the undersubstrate 21 and the crystal 22 is moderated, a crystal 22 having a low dislocation density can be grown. According to this embodiment, the dislocation density of the crystal 22 to be grown is $1 \times 10^3$ cm$^{-2}$ or more and less than $1 \times 10^7$ cm$^{-2}$ and preferably $1 \times 10^3$ cm$^{-2}$ or more and less than $1 \times 10^5$ cm$^{-2}$.

In this embodiment, the crystal 22 is grown to contact the main surface 21a of the undersubstrate 21. In other words, no mask layer or the like is interposed between the undersubstrate 21 and the crystal 22. In this manner, a crystal 22 polarized so that the arrow direction (growth surface) indicates the positive pole can be obtained.

The method for growing the crystal is not particularly limited. Vapor-phase growth such as a sublimation method, a hydride vapor phase epitaxy (HVPE), a molecular beam epitaxy (MBE), and metal organic chemical vapor deposition (MOCVD), and liquid-phase growth such as a flux growth method and a high-nitrogen-pressure solution method may be employed.

Figure 5:
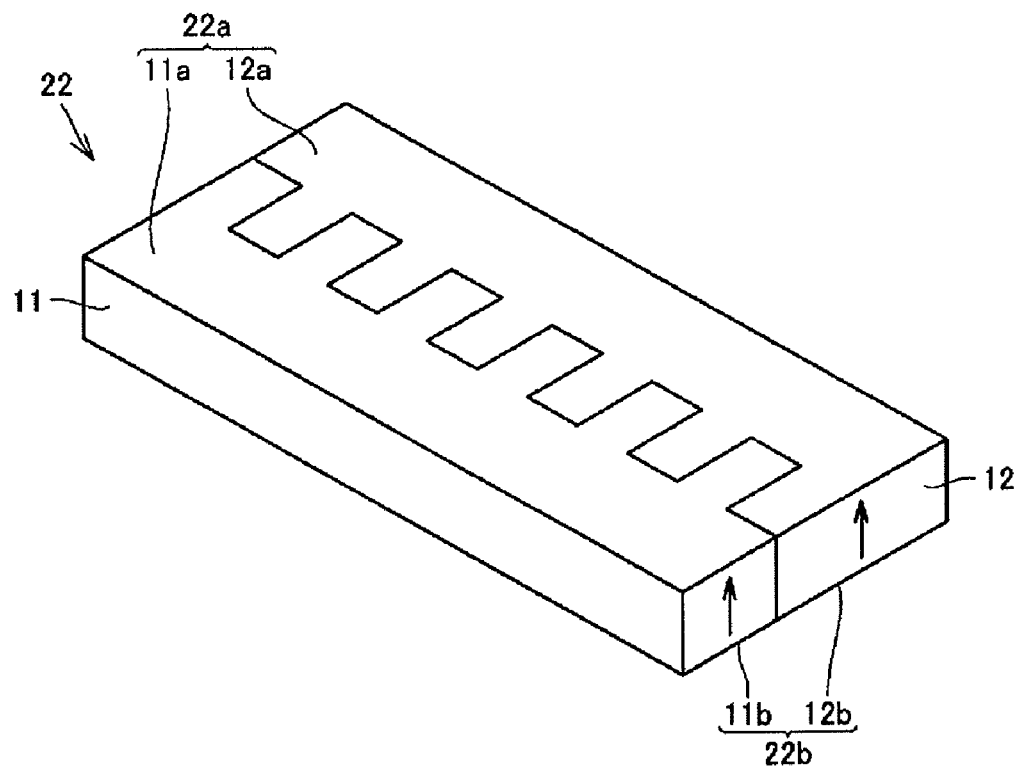
FIG. 5 is a perspective view schematically showing the state of dividing a crystal according to the first embodiment of the present invention.

FIG. 5 is a perspective view schematically showing the state of dividing the crystal 22 according to this embodiment.

Figure 6:
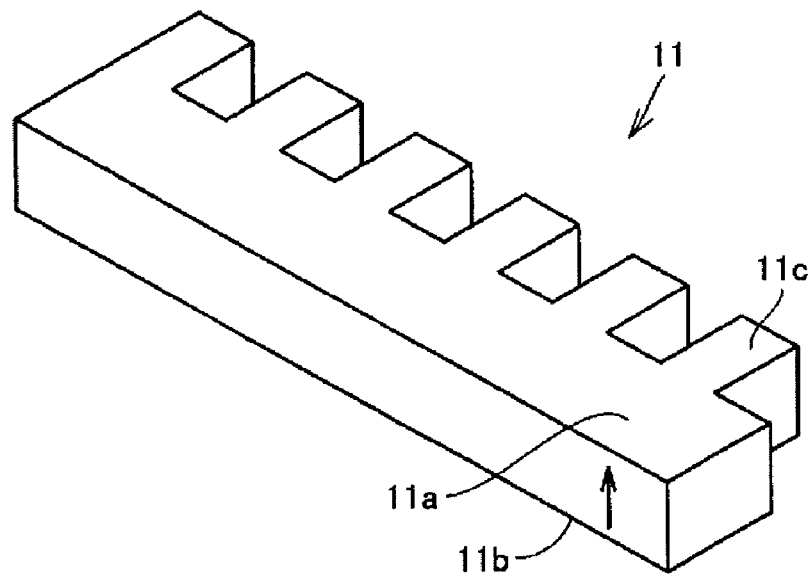
FIG. 6 is a perspective view schematically showing a first crystal formed by dividing the crystal according to the first embodiment of the present invention.

FIG. 6 is a perspective view schematically showing the first crystal 11 formed by dividing the crystal 22 according to this embodiment. As shown in FIGS. 5 and 6, the crystal 22 is divided into two or more parts so that the domains are inverted to obtain the first crystal 11 and the second crystal 12. Thus, the dislocation density of the crystals 11 and 12 is $1 \times 10^3$ cm$^{-2}$ or more and less than $1 \times 10^7$ cm$^{-2}$ and preferably $1 \times 10^3$ cm$^{-2}$ or more and less than $1 \times 10^5$ cm$^{-2}$. The composition and refractive index of the first and second crystals 11 and 12 are the same.

In this embodiment, as shown in FIG. 5, the crystal is divided along the direction of growth so that the growth surface has a comb shape. In other words, the crystal is divided into the first and second crystals 11 and 12 so as to have a comb shape when viewed from the main surface 22a of the crystal 22.

The method for dividing the crystal is not particularly limited but a laser, a wire saw, or the like can be used. When the crystal is divided with a laser, there is an advantage that the process precision is improved. When the crystal is divided using a wire saw, there is an advantage that the cost can be reduced.

As a result, as shown in FIG. 6, a first crystal 11 having a positive pole in a direction that extends from a second face 11b toward the first face 11a can be formed. Moreover, a second crystal 12 having a positive pole in a direction that extends from the second surface 12b toward the first surface 12a can be formed as shown in FIG. 5.

Figure 7:
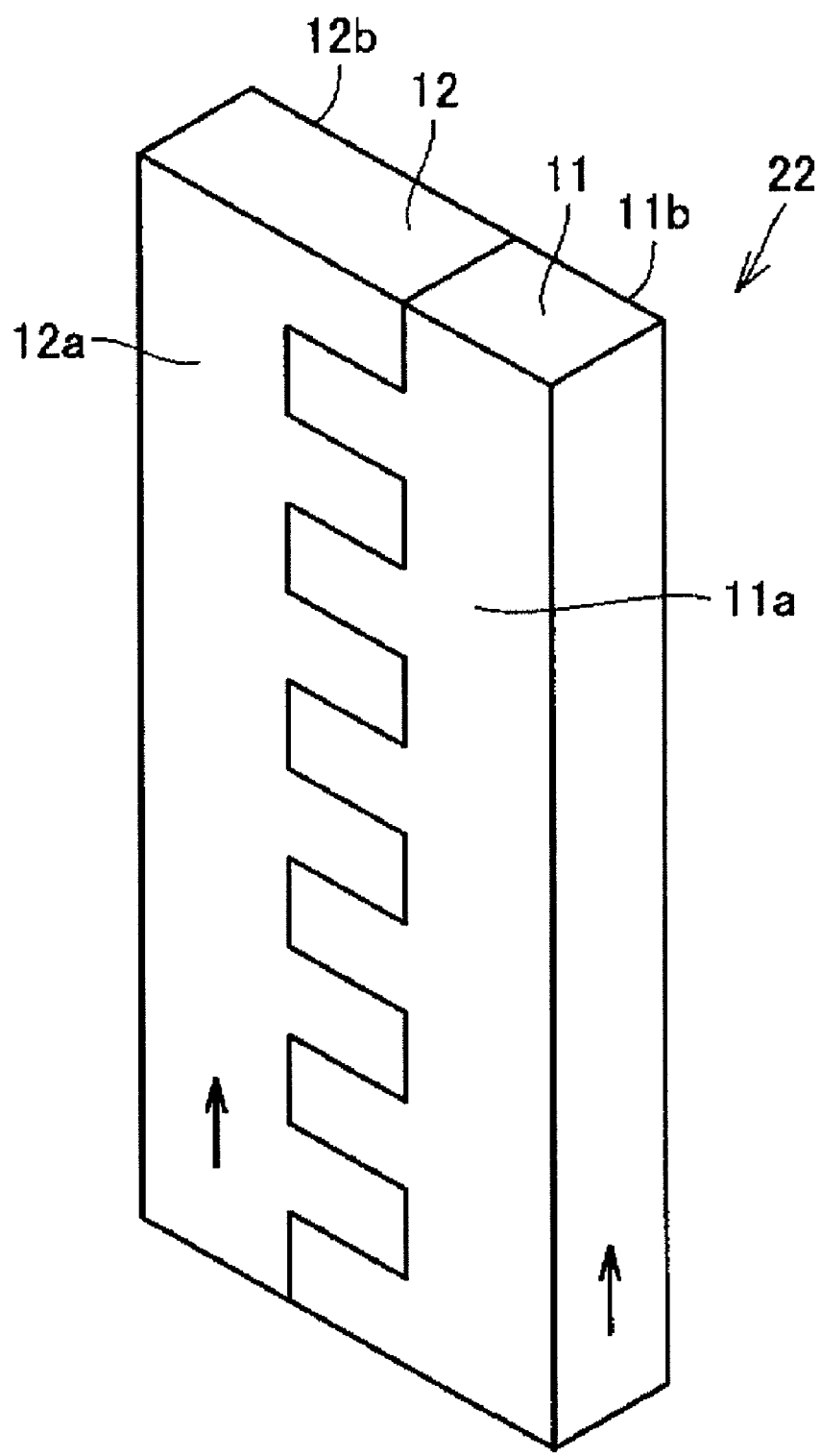
FIG. 7 is a perspective view schematically showing another state of dividing a crystal according to the first embodiment of the present invention.

FIG. 7 is a perspective view schematically showing another state of dividing the crystal 22 according to this embodiment. As shown in FIG. 7, the crystal 22 may be divided along the direction of growth so that the surface (surface in the growth direction) intersecting the growth surface has a comb shape to form the first and second crystals 11 and 12.

The shape into which the crystal 22 is divided is not limited to the comb shape shown in FIGS. 5 and 7. As shown in FIG. 2, the crystal 22 may be divided so that one surface has a sawtooth shape. In this case, there is an advantage that processing is extremely easy.

Next, at least one of the surfaces of the first and second crystals 11 and 12 is etched. As a result, at least one of the surfaces of the first and second crystals 11 and 12 can be more reliably polarized. The etching may be wet-etching or dry-etching.

For example, when the first and second crystals 11 and 12 are AlN, a surface terminated with Al atoms can be easily formed by wet-etching with a potassium hydroxide (KOH) since the etching rate for nitrogen is higher than that for aluminum. When reactive ion etching (RIE) is conducted as dry etching, a surface terminated with Al atoms can be easily formed by using the other surface as a mask. The etching step may be omitted.

Next, at least one of the surfaces of the first and second crystals 11 and 12 is polished. A polished surface can be more reliably polarized. The polishing method is not particularly limited. For example, chemical mechanical planarization or the like may be employed. The polishing step may be omitted.

A domain-inverted structure in which the polarization directions of the first and second crystals 11 and 12 are periodically reversed is formed along the optical waveguide 13. The first and second crystals 11 and 12 are bonded to each other so that the domain-inverted structure satisfies the quasi phase matching conditions with respect to the incoming light 101.

In particular, only one of the first and second crystals 11 and 12 divided as shown in FIG. 5 or 7 is reversed by 180° so that the comb-shaped surfaces face each other. In this state, the first and second crystals 11 and 12 are bonded with each other. In this embodiment, since the first and second crystals 11 and 12 are comb-shaped or sawtooth-shaped, the crystals fit with each other. Annealing or the like may be subsequently performed so as to eliminate the gaps in the interfaces 14 between the first and second crystals 11 and 12.

According to the method described above, as shown in FIG. 1 or 2, a domain-inverted structure having a polarization direction periodically reversed along the optical waveguide 13 is formed, and wavelength conversion elements 10*a* and 10*b* that include the domain-inverted structure satisfying the quasi phase matching conditions with respect to the incoming light 101 can be manufactured.

Operation of the wavelength conversion elements 10*a* and 10*b* will now be described. First, incoming light 101 is input from one end 13*a* of the optical waveguide 13 of the wavelength conversion element 10*a* or 10*b*. The incoming light 101 is preferably input perpendicular to the domain interfaces 14 between the first and second crystals 11 and 12. The incoming light 101 passes through the optical waveguide 13 toward the other end 13*b* of the optical waveguide 13. During this process, the wavelength of the incoming light 101 is converted with the first and second crystals 11 and 12 having a domain-inverted structure that satisfies the quasi phase matching conditions in the optical waveguide 13. Then outgoing light 102 having a converted wavelength is emitted from the other end 13*b* of the optical waveguide 13. Thus, the incoming light 101 having a particular wavelength can be converted into the outgoing light 102 having a different wavelength.

As discussed above, the wavelength conversion elements 10*a* and 10*b* each have the optical waveguide 13, converts the wavelength of the incoming light 101 input from one end 13*a* side of the optical waveguide 13, and outputs the outgoing light 102 from the other end 13*b* side of the optical waveguide 13. The wavelength conversion elements each include a first crystal 11 composed of $Al_xGa_{(1-x)}N$ ($0.5 \leq x \leq 1$) and a second crystal 12 having the same composition as the first crystal 11. The first and second crystals 11 and 12 form a domain-inverted structure in which the polarization direction is periodically reversed along the optical waveguide 13, and the domain-inverted structure satisfies the quasi phase matching conditions with respect to the incoming light 101. At least one of the first and second crystals 11 and 12 has a dislocation density of $1 \times 10^3$ cm$^{-2}$ or more and less than $1 \times 10^7$ cm$^{-2}$.

A method for manufacturing the wavelength conversion element 10*a* or 10*b* according to this embodiment includes a step of preparing an undersubstrate 21 composed of $Al_xGa_{(1-x)}N$ ($0.5 \leq x \leq 1$), a step of growing a crystal 22 having the same composition as the undersubstrate 21 on the undersubstrate 21, a step of forming a first crystal 11 and a second crystal 12 by dividing the crystal 22 into two or more parts so that the domains thereof are inverted, and a step of forming a domain-inverted structure in which the polarization directions of the first and second crystals 11 and 12 are periodically inverted along the optical waveguide 13 and bonding the first and second crystals 11 and 12 to each other so that the domain-inverted structure satisfies quasi phase matching conditions with respect to the incoming light 101.

According to the wavelength conversion elements 10*a* and 10*b* and the method for manufacturing the same, the crystal 22 having the same composition as that of the undersubstrate 21 is formed on the undersubstrate 21. Accordingly, dislocations are prevented from occurring in the crystal 22 due to the lattice mismatch with the undersubstrate 21. As a result, first and second crystals 11 and 12 having a dislocation density of $1 \times 10^3$ cm$^{-2}$ or more and less than $1 \times 10^7$ cm$^{-2}$ can be formed. Since the optical waveguide 13 is formed by bonding the first and second crystals 11 and 12 having low dislocation densities, absorption of the energy of the incoming light 101 by dislocations in the first and second crystals 11 and 12 can be suppressed. Thus, the temperatures of the first and second crystals 11 and 12 can be suppressed from increasing. The decrease in intensity of the outgoing light 102 can be suppressed by the use of the wavelength conversion element 10*a*. Accordingly, a wavelength conversion element 10*a* having an improved property-maintaining life can be realized.

Second Embodiment

A wavelength conversion element of this embodiment is substantially the same as the wavelength conversion elements 10*a* and 10*b* of the first embodiment shown in FIGS. 1 and 2. Only the first crystal 11 may be polarized and the second the second crystal 12 may be unpolarized.

Next, a method for manufacturing the wavelength conversion element 10*a* or 10*b* according to this embodiment is described. The method for manufacturing the wavelength conversion element 10*a* or 10*b* according to this embodiment basically has the same features as that of the first embodiment but differs in that the second crystal 12 formed from the crystal 22 from which the first crystal 11 is formed is not used.

In particular, as in the first embodiment, an undersubstrate 21 composed of $Al_xGa_{(1-x)}N$ ($0.5 \leq x \leq 1$) is prepared. Next, as in the first embodiment, a first crystal 12 (crystal 22) having the same composition as the undersubstrate 21 is formed on the undersubstrate 21.

Then a second crystal 12 having the same composition as the first crystal 11 is prepared. In this embodiment, a first crystal 11 shown in FIG. 6 is formed and a second crystal 12 that can form a domain-inverted structure with the first crystal 11 is prepared.

As a method for preparing the second crystal 12, for example, a plurality of first and second crystals 11 and 12 shown in FIG. 5 or 7 are formed so that a second crystal 12 is prepared from a crystal 22 different from the crystal 22 from which the first crystal 11 is formed. Alternatively, a crystal 22 may be grown so that the crystal does not have a polarity and a second crystal 12 may be prepared by processing the crystal 22 into a shape that fits the first crystal 11.

In such a case, since the crystal 22 is formed on the undersubstrate 21 having the same composition, the dislocation densities of the first and second crystals 11 and 12 can be reduced to $1 \times 10^3$ cm$^{-2}$ or more and less than $1 \times 10^7$ cm$^{-2}$ despite that the first and second crystals 11 and 12 are not formed from the same crystal 22. Since the first and second crystals 11 and 12 have substantially the same composition, there is no substantial difference in refractive index.

Next, as in the first embodiment, a domain-inverted structure in which the polarization directions of the first and second crystals 11 and 12 are periodically reversed along the optical waveguide 13 is formed, and the first and second crystals 11 and 12 are bonded to each other so that the domain-inverted structure satisfies the quasi phase matching conditions with respect to the incoming light 101.

As discussed above, according to the method for manufacturing the wavelength conversion element 10*a* or 10*b* of this embodiment, the crystal 11 having the same composition as that of the undersubstrate 21 is formed on the undersubstrate 21. As a result, a first crystal 11 having a dislocation density of $1\times10^3$ cm$^{-2}$ or more and less than $1\times10^7$ cm$^{-2}$ can be formed. Since the first crystal 11 having a low dislocation density forms the optical waveguide 13, absorption of the energy of the incoming light 101 by the dislocations can be suppressed. Thus, an increase in temperature of the first crystal 11 can be suppressed. The decrease in intensity of the outgoing light 102 can be suppressed by the use of the wavelength conversion element 10a or 10b. Accordingly, a wavelength conversion element 10a or 10b having an improved property-maintaining life can be manufactured.

In particular, it is advantageous to polarize only the first crystal 11, prepare the second crystal 12 with another material, and fit the first crystal 11 and the second crystal 12 since a wavelength conversion element 10a or 10b can be easily manufactured.

Third Embodiment

Figure 8:
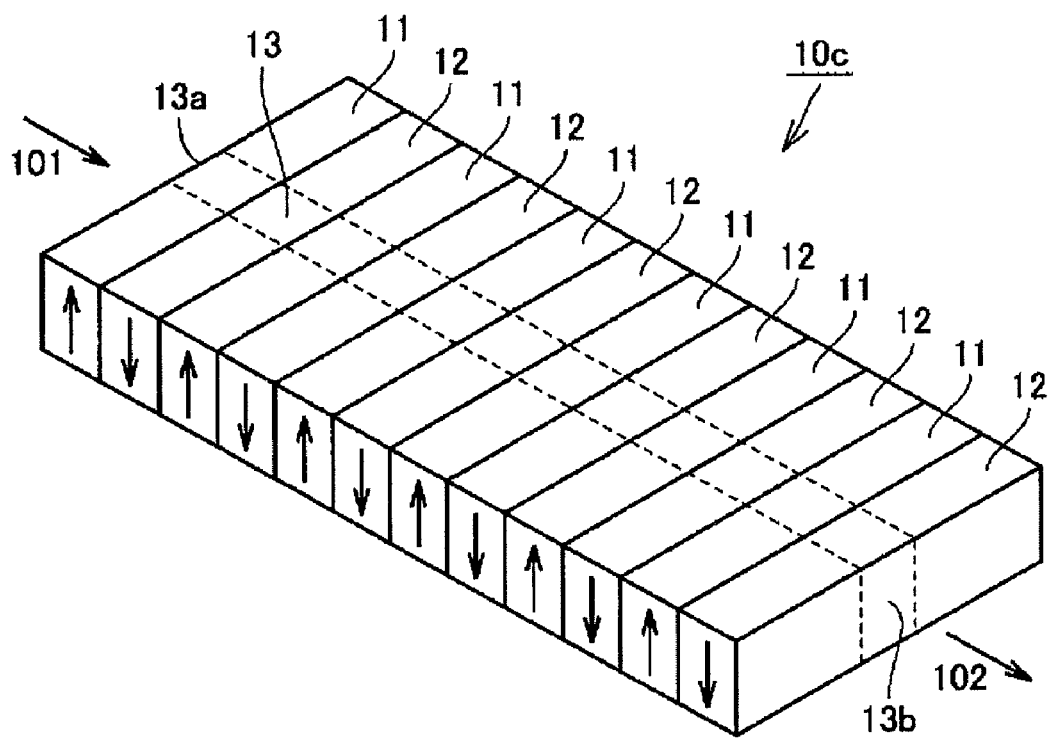
FIG. 8 is a perspective view schematically showing a wavelength conversion element according to a third embodiment of the present invention.

FIG. 8 is a perspective view schematically showing a wavelength conversion element according to this embodiment. A wavelength conversion element 10c of the embodiment is described with reference to FIG. 8. The wavelength conversion element 10c of this embodiment basically has the same structure as the wavelength conversion elements 10a and 10b of the first embodiment but differs therefrom in the shapes of the first and second crystals 11 and 12.

In particular, a plurality of first crystals and a plurality of second crystals are alternately adjacent to each other as to be arranged in a direction intersecting the direction in which the optical waveguide 13 extends. The positive pole of the first crystal 11 is oriented in the arrow direction (upward direction), and the positive pole of the second crystal 12 is oriented in the arrow direction (downward direction). In other words, the first and second crystals 11 and 12 are formed so that the domains of the first and second crystals 11 and 12 are inverted in the direction intersecting the direction in which the optical waveguide 13 extends. Note that one of the first and second crystals 11 and 12 may have no polarity.

In this embodiment, the first and second crystals 11 and 12 are not fitted with each other but are bonded or integrated with each other.

Next, a method for manufacturing the wavelength conversion element 10c according to this embodiment is described. The method for manufacturing the wavelength conversion element of this embodiment is basically the same as that of the first embodiment but differs therefrom in the shapes of the first and second crystals 11 and 12 obtained by dividing the crystal 22.

In particular, the crystal 22 is divided into two or more pieces in a direction parallel to the crystal growth direction to form a plurality of rectangular parallelepiped first and second crystals 11 and 12. In this case, the first and second crystals 11 and 12 are not fitted but are bonded with each other.

In such a case, since the crystal 22 is formed on the undersubstrate 21 having the same composition, the dislocation densities of the first and second crystals 11 and 12 can be reduced to $1\times10^3$ cm$^{-2}$ or more and less than $1\times10^7$ cm$^{-2}$. Since the first and second crystals 11 and 12 have substantially the same composition, there is no substantial difference in refractive index.

The wavelength conversion element 10c of this embodiment may be manufactured as follows without bonding the first and second crystals 11 and 12.

In particular, as in the first embodiment, an undersubstrate 21 composed of $Al_xGa_{(1-x)}N$ ($0.5 \leq x \leq 1$) is prepared as shown in FIG. 3.

Figure 9:
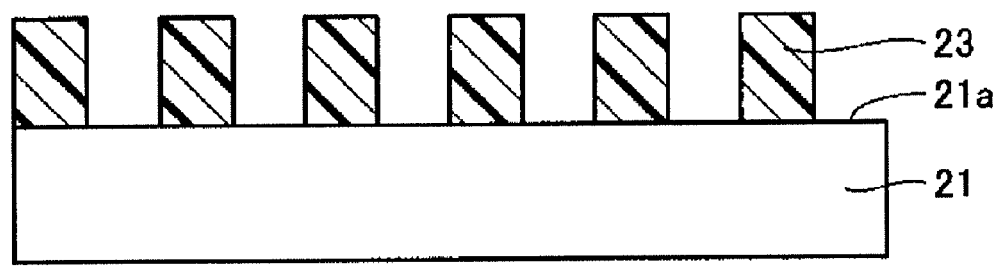
FIG. 9 is a cross-sectional view schematically showing a state of forming a mask layer according to the third embodiment of the present invention.

FIG. 9 is a cross-sectional view schematically showing the state of forming a mask layer 23 of this embodiment. As shown in FIG. 9, the mask layer 23 having openings is formed on the undersubstrate 21.

Figure 10:
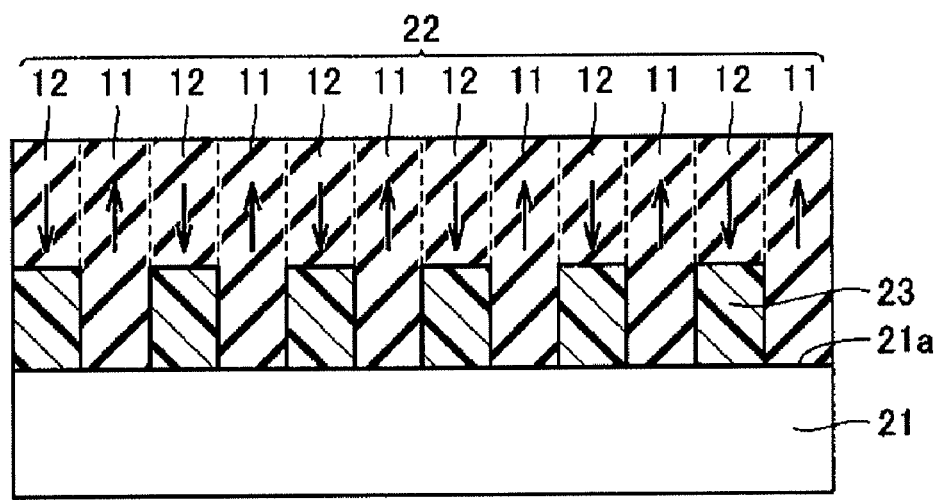
FIG. 10 is a cross-sectional view schematically showing a state of first and second crystals grown according to the third embodiment of the present invention.

FIG. 10 is a cross-sectional view schematically showing the state of first and second crystals grown according to this embodiment. As shown in FIG. 10, a crystal having the same composition as that of the undersubstrate 21 is grown on the undersubstrate 21 or the mask layer 23 so as to form a first crystal 11 grown by making contact with the undersubstrate 21 and a second crystal 12 grown by making contact with the mask layer 23. In this forming step, a domain-inverted structure in which the polarization directions of the first and second crystals 11 and 12 are periodically reversed along the optical waveguide 13 is formed, and the first and second crystals 11 and 12 are formed so that the domain-inverted structure satisfies the quasi phase matching conditions with respect to the incoming light 101.

When a main surface 21a of the undersubstrate 21 is a c plane, the first crystal 11 in contact with the main surface 21a of the undersubstrate 21 (exposed through the openings in the mask layer 23) is grown so that the thickness increases in the +c axis direction. The second crystal 12 in contact with the mask layer 23 is grown so that the thickness increases in the −c axis direction.

Since the first and second crystals 11 and 12 are formed on the undersubstrate 21 having the same composition, the dislocation densities of the first and second crystals 11 and 12 can be reduced to $1\times10^3$ cm$^{-2}$ or more and less than $1\times10^7$ cm$^{-2}$. Since the first and second crystals 11 and 12 have the same composition, there is no substantial difference in refractive index.

The wavelength conversion element 10c of the embodiment shown in FIG. 8 can be manufactured by the above-described method.

As discussed above, according to the method for manufacturing the wavelength conversion element 10c of this embodiment, the first and second crystals 11 and 12 having the same composition as that of the undersubstrate 21 are formed on the undersubstrate 21. As a result, first and second crystals 11 and 12 having a dislocation density of $1\times10^3$ cm$^{-2}$ or more and less than $1\times10^7$ cm$^{-2}$ can be formed. Since the first and second crystals 11 and 12 having low dislocation densities form the optical waveguide 13, absorption of the energy of the incoming light 101 by the dislocations can be suppressed. Thus, the increase in temperatures of the first and second crystals 11 and 12 can be suppressed. The decrease in intensity of the outgoing light 102 can thus be suppressed by the use of the wavelength conversion element 10c. Accordingly, a wavelength conversion element 10c having an improved property-maintaining life can be manufactured.

Fourth Embodiment

Figure 11:
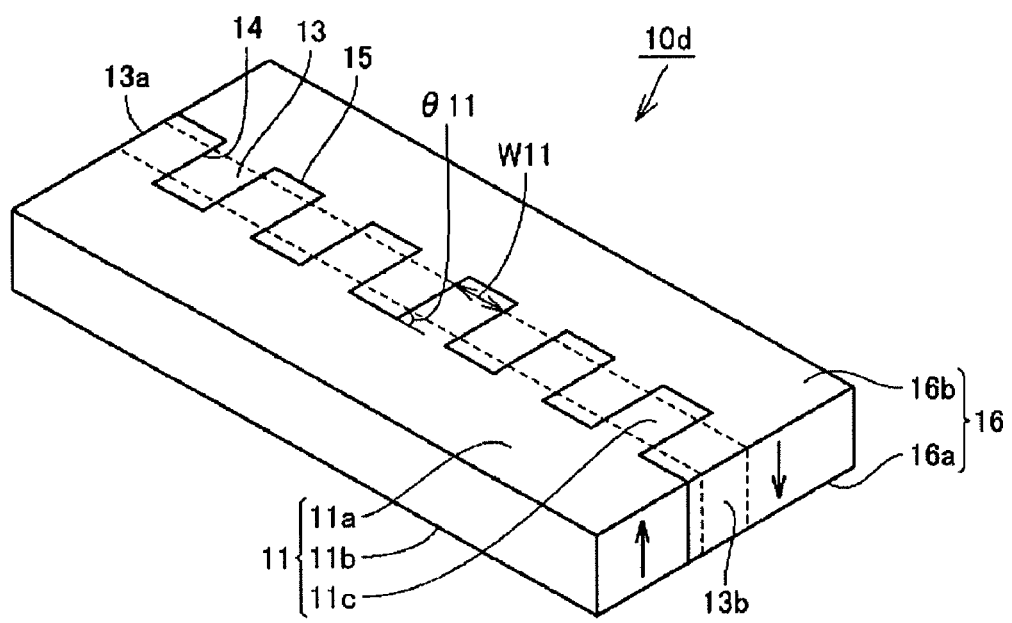
FIG. 11 is a perspective view schematically showing a wavelength conversion element according to a fourth embodiment of the present invention.

FIG. 11 is a perspective view schematically showing a wavelength conversion element according to this embodiment. As shown in FIG. 11, a wavelength conversion element 10d of this embodiment basically has the same structure as the wavelength conversion element 10a of the first embodiment shown in FIG. 1 but differs therefrom in that the second crystal is an amorphous crystal 16.

In this embodiment, the first crystal 11 is a single crystal and has a dislocation density of $1\times10^3$ cm$^{-2}$ or more and less than $1\times10^7$ cm$^{-2}$.

As shown in FIG. 6, two or more projecting portions 11c and recessed portions that are arranged regularly are formed on a surface of the first crystal 11. The projecting portions 11c are projecting in the same shape toward the direction that intersects the direction in which the optical waveguide 13 extends (the direction in which the incoming light 101 passes through the optical waveguide 13). As shown in FIG. 11, in the projecting portions 11c, the width W11 of a portion forming a wall of the optical waveguide 13 is preferably a predetermined dimension or more. The "predetermined dimension" is, for example, 26 μm or more. The projecting angle θ11 of the projecting portions is preferably 90° or near.

The amorphous crystal 16 has the same projecting portions and recessed portions as those of the first crystal 11. The recessed portions of the amorphous crystal 16 is joined with the projecting portions 11c of the first crystal 11, and the projecting portions of the amorphous crystal 16 are joined with the recessed portions of the first crystal 11.

The difference in refractive index between the amorphous crystal 16 and the first crystal 11 at a wavelength of 400 to 800 nm is preferably 0.001 or more and 0.1 or less.

Next, a method for manufacturing the wavelength conversion element according to this embodiment is described. First, as in the first embodiment, an undersubstrate 21 composed of $Al_xGa_{(1-x)}N$ ($0.5 \leq x \leq 1$) is prepared.

Next, a first crystal 11 having the same composition as that of the undersubstrate 21 is formed on the undersubstrate 21. Next, two or more projecting portions that are arranged regularly are formed on a surface of the first crystal 11. In these steps, as in the first embodiment, for example, a crystal 22 is grown on the undersubstrate 21 and the first crystal 11 is obtained by dividing the crystal 22 so that the first crystal 11 has two or more projecting portions that are regularly arranged. Since the crystal 22 is formed on the undersubstrate 21 having the same composition, the dislocation density of the first crystal 11 obtained from the crystal 22 can be reduced to $1 \times 10^3$ cm$^{-2}$ or more and less than $1 \times 10^7$ cm$^{-2}$. As a result, a first crystal 11 shown in FIG. 6 can be formed.

Figure 12:
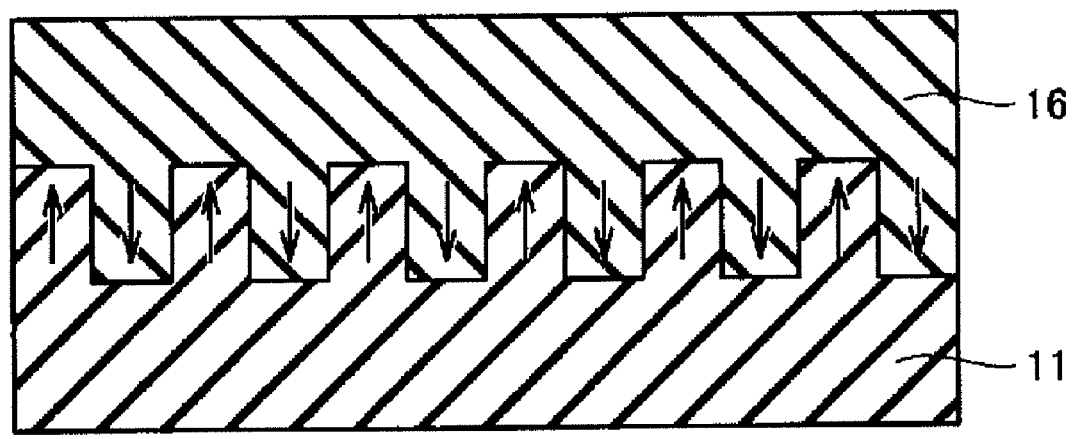
FIG. 12 is a cross-sectional view schematically showing a state of a grown amorphous crystal according to the fourth embodiment of the present invention.

FIG. 12 is a cross-sectional view schematically showing the state of the grown amorphous crystal 16 according to this embodiment. As shown in FIG. 12, a second crystal, which is the amorphous crystal 16, having the same composition as that of the first crystal 11 is grown on the surface of the first crystal 11. In this step, a domain-inverted structure in which the polarization directions of the first and second crystals 11 and 12 are periodically reversed along the optical waveguide 13 is formed, and the first and second crystals 11 and 12 are formed so that the domain-inverted structure satisfies the quasi phase matching conditions with respect to the incoming light 101. The method for growing the amorphous crystal 16 is not particularly limited.

When the amorphous crystal 16 is grown, the polarity of the first crystal 11 and the polarity of the amorphous crystal 16 become opposite to each other. Thus, a domain-inverted structure can be easily formed.

The amorphous crystal 16 is formed on the first crystal 11. The amorphous crystal 16 has the same composition as that of the first crystal 11. Thus, the refractive index of the amorphous crystal 16 is substantially the same as the refractive index of the first crystal 11. In particular, it is preferable to grow the amorphous crystal 16 so that the difference in refractive index between the first crystal and the amorphous crystal is 0.001 or more and 0.1 or less at a wavelength of 400 to 800 nm. As a result, a wavelength conversion element 10d shown in FIG. 11 can be manufactured.

As discussed above, according to the method for manufacturing the wavelength conversion element 10d of this embodiment, the crystal 11 having the same composition as that of the undersubstrate 21 is formed on the undersubstrate 21. Thus, a first crystal 11 having a dislocation density of $1 \times 10^3$ cm$^{-2}$ or more and less than $1 \times 10^7$ cm$^{-2}$ can be formed. Since the first crystal 11 having a low dislocation density forms the optical waveguide 13, absorption of the energy of the incoming light 101 by the dislocations can be suppressed. Thus, the increase in temperature of the first crystal 11 can be suppressed. The decrease in intensity of the outgoing light 102 can be suppressed by the use of the wavelength conversion element 10d. Accordingly, a wavelength conversion element 10d having an improved property-maintaining life can be manufactured.

EXAMPLES

In Examples, the effect achieved by inclusion of the first and second crystals 11 and 12 having a dislocation density of $1 \times 10^3$ cm$^{-2}$ or more and less than $1 \times 10^7$ cm$^{-2}$ was investigated.

Examples 1 and 2

Wavelength conversion elements of Examples 1 and 2 were manufactured basically according to the first embodiment. In particular, as the undersubstrate 21 of the Examples 1 and 2, an MN single crystal substrate and an Al0.5Ga0.5N single crystal substrate that have a main surface 22a constituted by a (0001) plane were respectively prepared.

Next, a crystal 22 having the same composition as the undersubstrate 21 was formed on the undersubstrate 21 by a sublimation method. Then the surface of the crystal 22 was subjected to CMP polishing.

Next, the crystal 22 was divided into two or more parts so that the polarization was reversed so as to form comb-shaped first and second crystals 11 and 12 as shown in FIG. 7. Thirty eight first crystals 11 and thirty eight second crystals 12 were formed. With respect to the projecting portions of the first and second crystals 11 and 12, the width of the portions forming the wall of the optical waveguide 13 (in case of the first crystal 11, the width W11 shown in FIG. 11) was set to 26.6 μm.

The dislocation densities of the obtained first and second crystals 11 and 12 were measured by a molten alkali etching method using KOH—NaOH (sodium hydroxide). The results are indicated in Table 1 below.

Then, the first and second crystals 11 and 12 were alternately bonded with each other for thirty eight periods. As a result, as shown in FIG. 1, a domain-inverted structure in which the polarization directions of the first and second crystals 11 and 12 were periodically reversed along the optical waveguide 13 was formed, and the domain-inverted structure satisfied the quasi phase matching conditions with respect to the incoming light 101. Thus, the wavelength conversion elements 10a of Examples 1 and 2 were manufactured.

Examples 3 and 4

Wavelength conversion elements of Examples 3 and 4 were manufactured basically as in Examples 1 and 2 except that the temperature of the main surface 21a of the undersubstrate 21 during growth was low, i.e., 2000° C., in Examples 3 and 4 whereas the temperature was 2200° C. in Examples 1 and 2.

Comparative Examples 1 and 2

Wavelength conversion elements of Comparative Examples 1 and 2 were manufactured basically as in Examples 1 and 2 except that a silicon carbide (SiC) substrate having a (0001) main surface was used as the undersubstrate 21.

Comparative Examples 3 and 4

Wavelength conversion elements of Comparative Examples 3 and 4 were manufactured basically as in Examples 1 and 2 except that a sapphire ($Al_2O_3$) substrate having a (0001) main surface was used as the undersubstrate 21.

Evaluation Method

The attenuation ratios of the transmitting light and the increase in temperature of the wavelength conversion elements of Examples 1 to 4 and Comparative Examples 1 to 4 were measured.

In particular, a neodymium-YAG (Nd-YAG) laser beam having a wavelength of 1064 nm was input to the optical waveguide 13 so that the beam was perpendicular to the domain interfaces 14 between the first and second crystals 11 and 12 in each of Examples 1 to 4 and Comparative Examples 1 to 4 and the intensity of the light output from the optical waveguide 13 was measured as the initial intensity. After continuing irradiation for 10,000 hours, the intensity of the outgoing light 102 output from the optical waveguide 13 was measured. The ratio of the decrease in intensity after 10,000 hours of irradiation relative to the initial intensity was determined. The results are indicated in Table 1 below as the attenuation ratios of the transmitting light.

The initial temperature before the incoming light 101 was input to the wavelength conversion elements of Examples 1 to 4 and Comparative Examples 1 to 4 and the temperature after 10,000 hours of irradiation were measured. Then the ratio of the increase in temperature in Examples 1 to 4 and Comparative Examples 1, 2, and 4 was determined by assuming the temperature increase after 10,000 hours with respect to the initial temperature in Comparative Example 3 to be 1. The results are indicated in Table 1 below.

In contrast, the dislocation densities of the first and second crystals of Examples 1 to 4 were lower than the dislocation densities of Comparative Examples 1 to 4. Thus, the temperature increase in the wavelength conversion elements of Examples 1 to 4 was small and thus the attenuation ratio of the transmitting light could be decreased. Therefore, compared to Comparative Examples 1 to 4, Examples 1 to 4 had improved lifetime during which 99.9% or more of the initial properties can be maintained. In particular, the temperature increase in the wavelength conversion elements of Examples 1 and 2 in which the dislocation density was less than $1\times10^5$ $cm^{-2}$ was extremely small and thus the attenuation ratio of the transmitting light could be decreased to an extremely low level.

Accordingly, it was found that the attenuation ratio of the transmitting light can be decreased by decreasing the dislocation densities of the first and second crystals 11 and 12 and that the initial properties can be maintained despite long-term use when the dislocation density is less than $1\times10^7$ $cm^{-2}$ and more preferably less than $1\times10^5$ $cm^{-2}$.

As discussed above, Examples confirmed that the property-maintaining life can be improved with first and second crystals 11 and 12 having a dislocation density of $1\times10^3$ $cm^{-2}$ or more and less than $1\times10^7$ $cm^{-2}$ and preferably less than $1\times10^5$ $cm^{-2}$.

Although the present invention has been described through embodiments and examples, it is anticipated that the features of the embodiments and examples can be adequately combined. Moreover, it should be understood that the embodiments and examples disclosed herein are only exemplary in all aspects and not limiting. The scope of the present invention is defined by the claims and not by the embodiments described above and is intended to include all modification within the meaning and scope equivalent to the scope of the claims.

TABLE 1

|  | Undersubstrate | Crystal | Dislocation density ($cm^{-2}$) | Attenuation ratio (%) | Temperature increase |
|---|---|---|---|---|---|
| Example 1 | AlN | AlN | $1 \times 10^3$ | 0.1 | 0.001 |
| Example 2 | $Al_{0.5}Ga_{0.5}N$ | $Al_{0.5}Ga_{0.5}N$ | $1 \times 10^3$ | 0.1 | 0.001 |
| Example 3 | AlN | AlN | $1 \times 10^5$ | 0.3 | 0.003 |
| Example 4 | $Al_{0.5}Ga_{0.5}N$ | $Al_{0.5}Ga_{0.5}N$ | $1 \times 10^5$ | 0.3 | 0.003 |
| Comparative Example 1 | SiC | AlN | $1 \times 10^7$ | 1 | 0.1 |
| Comparative Example 2 | SiC | $Al_{0.5}Ga_{0.5}N$ | $1 \times 10^7$ | 1 | 0.1 |
| Comparative Example 3 | $Al_2O_3$ | AlN | $1 \times 10^8$ | 3 | 1 |
| Comparative Example 4 | $Al_2O_3$ | $Al_{0.5}Ga_{0.5}N$ | $1 \times 10^8$ | 3 | 1 |

Measurement Results

As a result of inputting incoming light having a wavelength of 1064 nm into the wavelength conversion elements of Examples 1 to 4 and Comparative Examples 1 to 4, outgoing light 102 having a wavelength of 532 nm was output.

However, as shown in Table 1, in wavelength conversion elements of Comparative Examples 1 to 4, the temperature increase was large and the attenuation ratio was large after 10,000 hours of irradiation.

Reference Signs List

| | |
|---|---|
| 10a, 10b, 10c, 10d | wavelength conversion element |
| 11 | first crystal |
| 11a, 12a | first face |
| 11b, 12b | second face |
| 11c | projecting portions |
| 12 | second crystal |
| 13 | optical waveguide |

Reference Signs List

| | |
|---|---|
| 13a | one end |
| 13b | other end |
| 14, 15 | interface |
| 16 | amorphous crystal |
| 21 | undersubstrate |
| 21a, 22a | main surface |
| 22 | crystal |
| 23 | mask layer |
| 101 | incoming light |
| 102 | outgoing light |
| W11 | width |
| θ11 | angle |

The invention claimed is:

1. A wavelength conversion element that has an optical waveguide and that converts a wavelength of incoming light input from one end of the optical waveguide and outputs outgoing light from the other end of the optical waveguide, the wavelength conversion element comprising:

a first crystal composed of $Al_xGa_{(1-x)}N$ ($0.5 \leq x \leq 1$); and a second crystal having the same composition as that of the first crystal, wherein the first and second crystals form a domain-inverted structure in which a polarization direction is periodically reversed along the optical waveguide, the domain-inverted structure satisfies quasi phase matching conditions with respect to the incoming light, and at least one of the first and second crystals has a dislocation density of $1 \times 10^3$ cm$^{-2}$ or more and less than $1 \times 10^7$ cm$^{-2}$.

2. The wavelength conversion element according to claim 1, wherein at least one of the first and second crystals has a dislocation density of $1 \times 10^3$ cm$^{-2}$ or more and less than $1 \times 10^5$ cm$^{-2}$.

3. A method for manufacturing a wavelength conversion element that has an optical waveguide and that converts a wavelength of incoming light input from one end of the optical waveguide and outputs outgoing light from the other end of the optical waveguide, comprising:

a step of preparing an undersubstrate composed of $Al_xGa_{(1-x)}N$ ($0.5 \leq x \leq 1$);

a step of growing a crystal having the same composition as that of the undersubstrate on the undersubstrate;

a step of dividing the crystal into two or more parts so that the polarization thereof is inverted to thereby form a first crystal and a second crystal; and a step of forming a domain-inverted structure in which polarization directions of the first and second crystals is periodically reversed along the optical waveguide and bonding the first and second crystals so that the domain-inverted structure satisfies quasi phase matching conditions with respect to the incoming light.

4. A method for manufacturing a wavelength conversion element that has an optical waveguide and that converts a wavelength of incoming light input from one end of the optical waveguide and outputs outgoing light from the other end of the optical waveguide, comprising:

a step of preparing an undersubstrate composed of $Al_xGa_{(1-x)}N$ ($0.5 \leq x \leq 1$);

a step of growing a first crystal having the same composition as that of the undersubstrate on the undersubstrate;

a step of preparing a second crystal having the same composition as that of the first crystal; and a step of forming a domain-inverted structure in which polarization directions of the first and second crystals is periodically reversed along the optical waveguide and bonding the first and second crystals so that the domain-inverted structure satisfies quasi phase matching conditions with respect to the incoming light.

5. A method for manufacturing a wavelength conversion element that has an optical waveguide and that converts a wavelength of incoming light input from one end of the optical waveguide and outputs outgoing light from the other end of the optical waveguide, comprising:

a step of preparing an undersubstrate composed of $Al_xGa_{(1-x)}N$ ($0.5 \leq x \leq 1$);

a step of growing a first crystal having the same composition as that of the undersubstrate on the undersubstrate;

a step of forming two or more projecting portions that are regularly arranged on a surface of the first crystal; and a step of growing a second crystal, which is an amorphous crystal, having the same composition as that of the first crystal on the surface of the first crystal, wherein in the step of growing the second crystal, a domain-inverted structure in which polarization directions of the first and second crystals are periodically reversed along the optical waveguide is formed and the first and second crystals are formed so that the domain-inverted structure satisfies quasi phase matching conditions with respect to the incoming light.

6. A method for manufacturing a wavelength conversion element that has an optical waveguide and that converts a wavelength of incoming light input from one end of the optical waveguide and outputs outgoing light from the other end of the optical waveguide, comprising:

a step of preparing an undersubstrate composed of $Al_xGa_{(1-x)}N$ ($0.5 \leq x \leq 1$);

a step of forming a mask layer having an opening on the undersubstrate; and a step of forming a first crystal grown by making contact with the undersubstrate and a second crystal grown by making contact with the mask layer by growing crystals having the same composition as that of the undersubstrate on the undersubstrate and the mask layer, wherein in the forming step, a domain-inverted structure in which polarization directions of the first and second crystals are periodically reversed along the optical waveguide is formed and the first and second crystals are formed so that the domain-inverted structure satisfies quasi phase matching conditions with respect to the incoming light.

* * * * *